Oct. 19, 1954
S. P. LOVELL
2,692,211
PROCESS FOR DRYING A CYCLIC PENTENE
IMPREGNATED ASBESTOS SHEET
Filed June 7, 1951
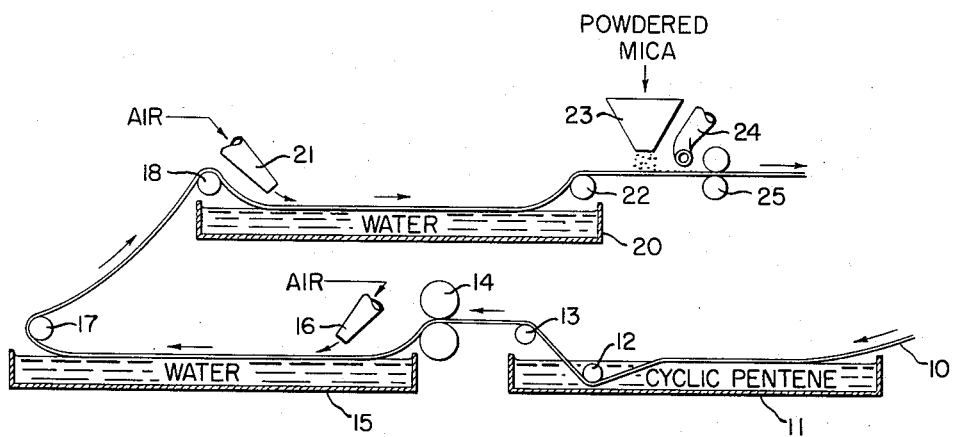
INVENTOR.
Stanley P. Lovell.
BY
Kenway, Jenney, Witter & Hildreth.
ATTORNEYS Patented Oct. 19, 1954

2,692,211

UNITED STATES PATENT OFFICE 2,692,211

PROCESS FOR DRYING A CYCLIC PENTENE IMPREGNATED ASBESTOS SHEET

Stanley P. Lovell, Newtonville, Mass., assignor to Lovell Chemical Company, Watertown, Mass., a corporation of Massachusetts Application June 7, 1951, Serial No. 230,374

3 Claims. (Cl. 117—103)

This invention comprises a new and useful insulating material including in its composition asbestos fibres in sheet or other fabricated forms, impregnated with a curable cyclic pentene. It includes within its scope a novel process of making such products.

The primary object of this invention is to provide a low cost insulating material of high dielectric strength resistant to heat and moisture. This invention moreover provides an insulating sheet which is pliable and conformable and which may accordingly be cut, formed, wound or otherwise incorporated in electrical or electronic equipment, and therein cured to bring out its best dielectric properties. The cured product is structurally strong, shape retaining and fulfills the specifications of class H insulation.

According to the present invention asbestos fibres, in sheet or other form, are impregnated with a cyclic-pentene drying oil and then dried (or oxidized) in air. The resulting product has been discovered to have excellent insulating properties, and upon heating the dried oil in the product becomes further polymerized and the insulating properties are enhanced.

The cyclic pentene drying oil with which this invention may be practised is any cyclic pentene-containing product which may be oxidized to a tough yet pliable film, in the manner of drying oils, and which may furthermore upon heating be caused further to polymerize to a strong rigid infusible resin. The preferred material is a cyclic pentene residue produced in the Houdry process of cracking petroleum distillates, especially the heavy part of the light ends of gasoline stock. This material consists of both aromatic and olefinic hydrocarbons. It has an iodine number of 210 and a boiling range of 375–1000° F. Structurally there appear to be one double bond (excluding aromatic bonds) per 14 carbon atoms and 5 rings per empirical mol, two aromatic and three cyclo pentene. When dried (oxidized) its molecular weight is about 400, and an ultimate analysis reveals the presence of 30 carbon and 40 hydrogen atoms per empirical molecule. This material, in liquid form, is marketed commercially as P. D. O. #40.

This invention, in its simplest embodiment, comprises the impregnation of asbestos fibres with a cyclic pentene drying oil, and the forming thereof to the desired article, as by calendering or extruding to a sheet, tube, rod or the like. Thereafter the product is dried in air whereby the drying oil hardens by oxidation and polymerization to a tough yet pliable conformable continuum embedding the asbestos. Upon the heating of the dried material to 180° C. for a short while, further polymerization of the drying oil, such as the formation of cross linkages, occurs. Thus the product is converted to hard metallike material of even better insulating properties.

In one important application of this invention a bibulous sheet of asbestos, 2 to 20 mils in thickness is impregnated with a cyclic pentene drying oil. It has been found that ordinary techniques, such as immersion and calendering, or doctor blade spreading, are not satisfactory because air bubbles are occluded in the sheet and cannot be readily dispelled without damage thereto. The technique which has been found most satisfactory for impregnating this sheet consists of floating the sheet on the surface of the liquid cyclic pentene drying oil. The oil is then drawn from one surface, into the interstitial voids of the sheet, by capillary action, and the air and other gases are displaced and impelled to escape through the other surfaces. Thus an impregnated continuous sheet is formed without any bubbles or occluded air pockets or interruptions to its continuity. The impregnated sheet may now be immersed and thereafter stripped to a uniform finish or load as by stripper rolls or doctor knives.

This sheet is now subjected on both surfaces to a blast of air until the surfaces are dried or oxidized. The impregnated sheet, prior to drying is highly water resistant, unlike asbestos alone, and this characteristic may be utilized in the drying process to avoid mechanical interference with the liquid surfaces thereof. This is done by floating the sheet, after impregnation, upon a surface of water, thus sealing the under side from air. The exposed upper surface is then subjected to a blast of air until that surface is sufficiently dry to be supported by mechanical means without deformation. Thereafter the sheet is supported from that surface and dried on both sides. The resulting sheet is a tough translucent pliable membrane.

During the drying or oxidation of the surfaces of the impregnated sheet a stage is reached wherein the surfaces become very tacky or sticky. It has been found desirable, both for ease of handling and to further improve the insulating properties, to apply a powder of an insulating material to these surfaces. For instance, powdered mica or any equivalent powder may be dusted thereon in excess, and the excess then shaken or blown off. The sheet may then be rolled to embed the powdered mica permanently in the surface. Thereafter the sheet is dried completely and ready for use.

The improved insulating material of this invention attains its optimum insulating properties after being heated to 180° C. to cause polymerization of the dried oil. This material may be used without carbonization at temperatures as high as 600° F., at a temperature of 750° F., although the material becomes somewhat discolored, there is no ashing or break-through and the dielectric strength is quite considerable. The properties of this insulating material under various conditions are shown in Tables I and II. It will be seen therefrom that optimum performance is at 356° C. which is the temperature demanded of class H insulation.

Since my invention comprises fundamentally the novel combination of asbestos fibre and cyclic pentene, it is possible to attain comparable results by admixing the cyclic pentene and free asbestos fibre and by extrusion through a slit or running through calender rolls to form the same sheet as above described.

The process and nature of my invention will be best understood and appreciated from the following description of a preferred manner of carrying out the process as shown in the accompanying drawings in which The figure is a diagrammatic view suggesting the various steps of the process.

The starting material is a web or thin sheet of asbestos fibre which may be in the order of .002" in thickness. This is readily obtainable as a commercial article. It is white in color, opaque and of a soft texture. It has very little tensile strength and readily disintegrates when wetted, being reduced almost to slime. This sheet has good dielectric properties when dry, but since it readily absorbs moisture it loses its resistivity and is therefore unreliable for use in a great many locations.

The first step of the process as shown in Fig. 1 consists in leading an asbestos sheet 10 into a tank 11 containing a cyclic pentene in such a manner that the sheet 10 floats upon the surface of the liquid pentene. In this stage of the process the pentene oil gradually permeates upwardly from the lower surface of the sheet 10, gradually displacing air entrained in the body of the sheet and completely and continuously saturating it. The action of the pentene oil upon the asbestos sheet 10 is remarkable and unpredictable. In the first place, it renders it transparent to a high degree, and in the second place, it immediately imparts a substantial degree of toughness and tensile strength to it. While an asbestos sheet wetted with an aqueous solution is so flimsy that it can be handled only with the greatest difficulty, the same asbestos sheet saturated with pentene oil immediately acquires sufficient tensile strength to permit it to be fed by rolls or festooned. Accordingly, after the sheet 10 has floated for a sufficient time upon the surface of the pentene oil to become thoroughly saturated, it is immersed by being passed downwardly about a roll 12 located near the bottom of the tank 11. From the roll 12 the saturated sheet is directed upwardly out of the tank and about a guide roll 13. From this it passes to a pair of squeeze rolls 14 where surplus liquid is removed.

The saturated and calendered sheet 10 is next directed to a tank 15 containing water, and while supported by and floating on the surface of the water, it is subjected to a blast of drying air delivered by a nozzle 16. At this stage of the process the pentene oil upon the upper surface of the sheet 10 is dried and thus converted to a tough film. After the upper surface of the sheet is dried, the sheet is directed by guide rolls 17 and 18 with reversal of direction to a second water tank 20 where the sheet is now supported by its opposite surface upon the water of the tank. In passing through the tank 20 the exposed surface of the sheet is dried by drying air supplied from a nozzle 21.

The completely dried sheet is now ready for use and will be found extremely tough, flexible and transparent in its characteristics, and of a light brown color.

If desired the sheet may be provided while tacky with a surface coating of powdered mica or other pulverized insulating medium. Accordingly, as shown in Fig. 1 the sheet is directed from the tank 20 upwardly over a guide roller 22 and beneath a distributing hopper 23 which is arranged to supply a copious amount of powdered mica or the like. Surplus powder is blown from the sheet by a nozzle 24 and the sheet with the residue is passed between squeeze rolls 25 by which the residual powdered coating is pressed into and embedded in the surface of the sheet.

As already explained the sheet prepared as above outlined may be used as insulating material. It may be folded, rolled or draped to cover any curved or angular surfaces, and then when heated above 180° C. it is further polymerized and converted in situ and as preformed into a stiff, hard, resilient body which is completely impervious to moisture and has now become opaque.

The following tables will illustrate the characteristics of the product prepared as above outlined at several significant stages in its potential life:

Table I

| Stage of Material | Dielectric v. p. m. | Dielectric Constant | Power Factor |
| --- | --- | --- | --- |
| Uncured, unpolymerized | 550 | 3.6 | 20.7 |
| Held at 750° F. 1 hour | 250 | 4.8 | 56.0 |
| 180° C. for 24 hours | 630 | 2.4 | 15.7 |

Table II

| Stage of Material | MM ohm-inches Vol. Resistivity | v. p. m. Breakdown Voltage | Immersion Water Absorption, hrs. |
| --- | --- | --- | --- |
| Uncured, unpolymerized | .32 | 600 | 0-1 |
| Held at 750° F. 1 hour | .27 | 350 | 0-1 |
| 180° C. for 24 hours | .35 | 600 | 0-1 |

From the above data it will be evident that my new sheet insulating material appears at best advantage at 180° C. which is the exact temperature demanded for class H insulation.

The pliable sheet product has sealing properties and when folded or wrapped and then heated to polymerizing temperature, its overlapped surfaces will bond firmly and permanently together.

Having thus disclosed my invention and described in detail a preferred manner of putting it into practice, I claim as new and desire to secure by Letters Patent:

1. The process of making curable insulating sheet material which comprises the steps of first saturating a sheet of asbestos fibre with a cyclic pentene, then providing aqueous support for the saturated sheet, and drying the sheet while so supported.

2. The process of making curable insulating sheet material which comprises the steps of first floating a sheet of asbestos fibre upon a bath of cyclic pentene thereby saturating the sheet, then providing aqueous liquid support for the saturated sheet and drying its exposed surface, and finally reversing the sheet and drying its other surface while the sheet still has aqueous liquid support.

3. A process of making a tough asbestos base sheet material which comprises the steps of saturating a bibulous asbestos sheet with a cyclic pentene drying oil, then floating the saturated sheet on a surface of water, thus sealing the under surface of the sheet from air, and then drying the exposed upper surface by subjecting it to a blast of air.

References Cited in the file of this patent

UNITED STATES PATENTS

| Number | Name | Date |
|---|---|---|
| 1,262,887 | Werner | Apr. 16, 1918 |
| 1,678,021 | Preble | July 24, 1928 |
| 1,766,932 | Novak | June 24, 1930 |
| 1,786,462 | Stryker | Dec. 30, 1930 |
| 2,188,901 | Hyatt et al. | Feb. 6, 1940 |
| 2,217,762 | McGill et al. | Oct. 15, 1940 |
| 2,227,444 | Drew | Jan. 7, 1941 |
| 2,317,487 | Schuelke | Apr. 27, 1943 |
| 2,319,271 | Soday | May 18, 1943 |
| 2,383,230 | Voke | Aug. 21, 1945 |
| 2,467,540 | Smith et al. | Apr. 19, 1949 |
| 2,534,818 | Holroyd et al. | Dec. 19, 1950 |
| 2,537,282 | Schaad | Jan. 9, 1951 |
| 2,568,004 | Heyman | Sept. 18, 1951 |
| 2,590,923 | Bloch et al. | Apr. 1, 1952 |
| 2,609,319 | Boge | Sept. 2, 1952 |

FOREIGN PATENTS

| Number | Country | Date |
|---|---|---|
| 657,262 | Germany | Feb. 28, 1938 |